United States Patent Office 3,456,898
Patented July 22, 1969

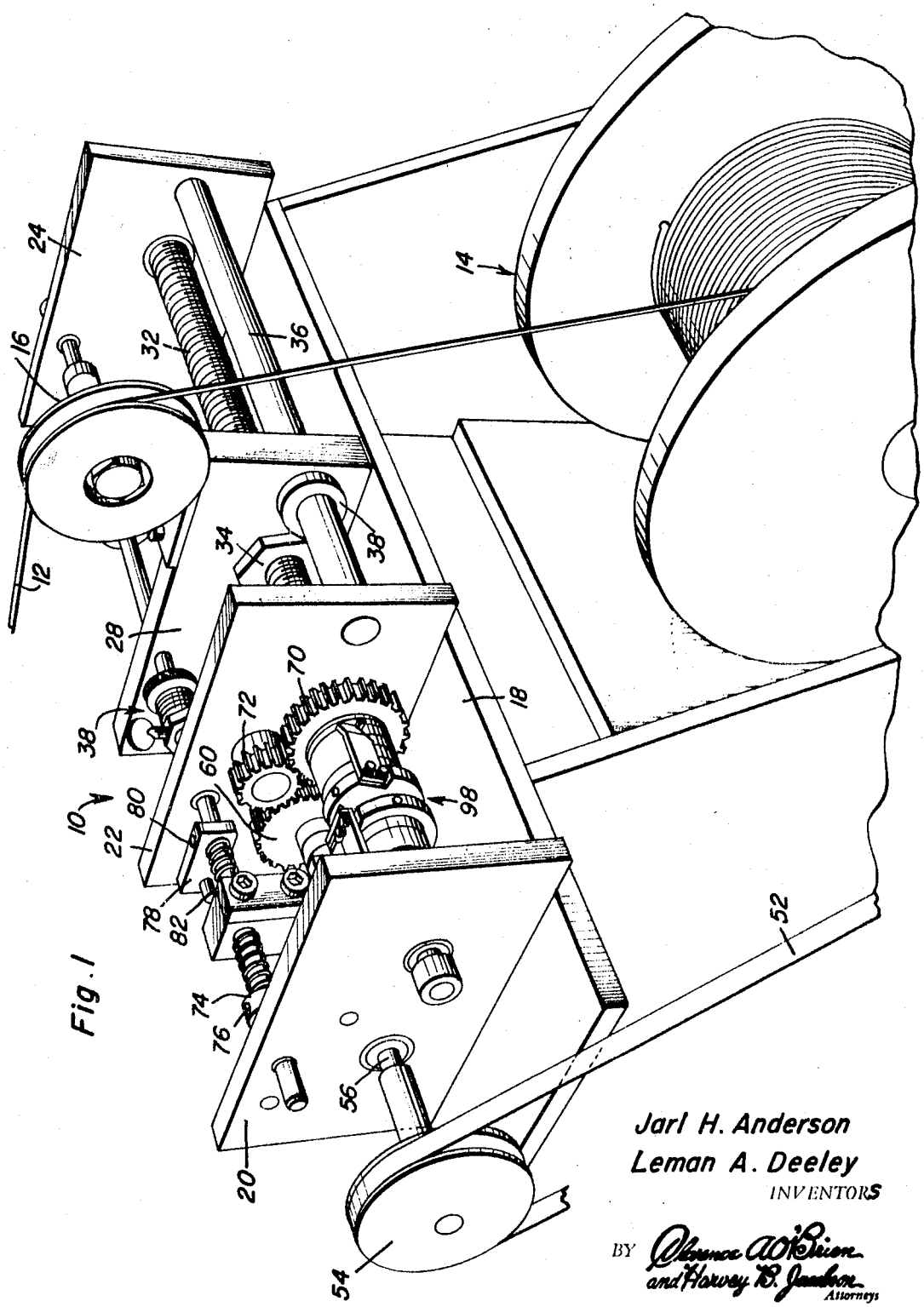

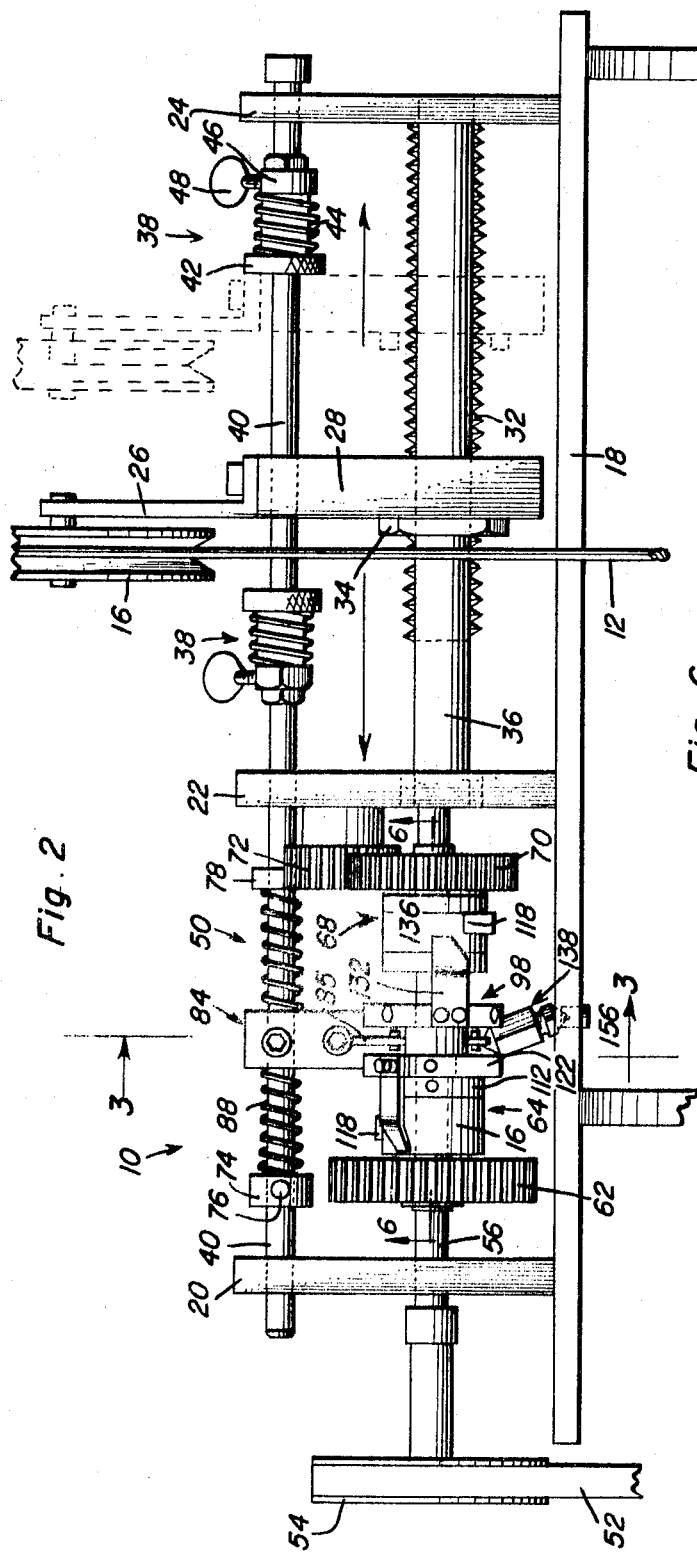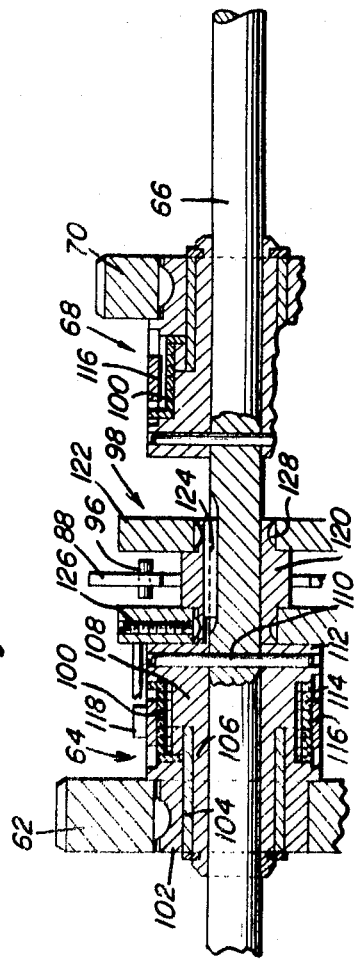
Jarl H. Anderson
Leman A. Deeley
INVENTORS

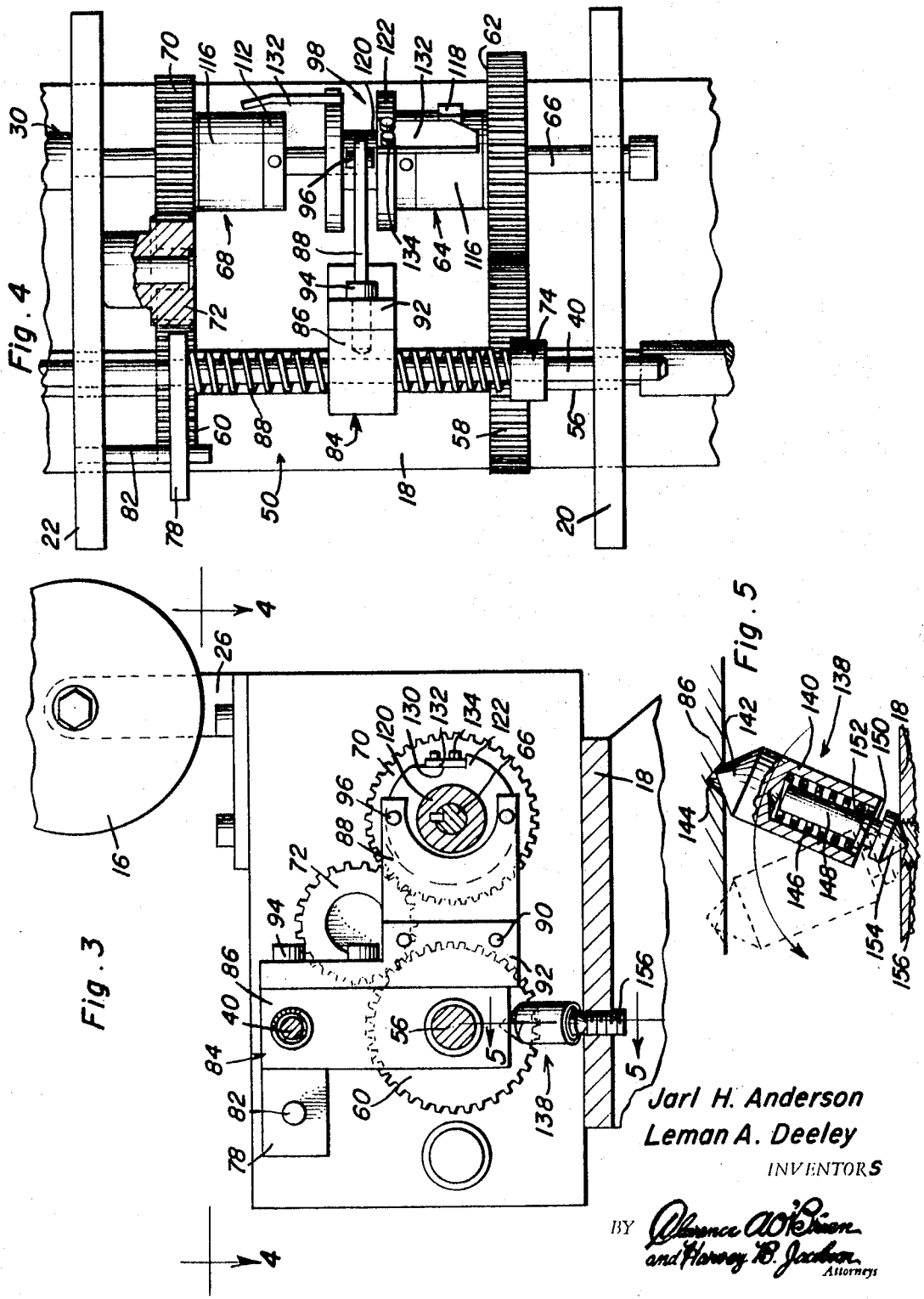

3,456,898
ACTIVATOR FOR LEVEL WIRE WINDER
Jarl H. Anderson, R.D. 1, Durhamville, N.Y. 13054, and Leman A. Deeley, Rte. 2, Blossvale, N.Y. 13308
Filed Mar. 31, 1967, Ser. No. 627,408
Int. Cl. B65h 57/28; F16h 25/12, 25/18
U.S. Cl. 242—158.4          12 Claims

ABSTRACT OF THE DISCLOSURE

A reversing cable guide for leveling the winding of a cable on a drum. Movement of the guide is reversed by alternate engagement of a pair of wrapping-coil type clutches through which torque is transmitted in opposite directions to an actuating shaft for advancement of the cable guide between its limit positions. A reversing control engaged by the guide at the limit positions yieldably shifts a clutch releasing mechanism to disengage one clutch and permit reengagement of the other in order to reverse rotation of the actuating shaft.

Background of the invention

This invention relates to a reversing control mechanism for a moving cable guide associated with the winding of cable on a drum. More particularly, the present invention is concerned with a novel type of reversing clutch control through which motion of a cable guide is reversed at predetermined limit positions thereof.

Cable guide reversing mechanisms heretofore utilized have been relatively complicated, and costly to manufacture and maintain. The provision of a reversing mechanism all parts of which are readily accessible for repair and adjustment purposes is therefore one of the problems to which the present invention is addressed.

Summary of the invention

In accordance with the present invention, reversal of the actuating screw shaft through which motion is imparted to a cable guide, is effected through a pair of axially spaced one-way clutches of the wrapping coil type. Each clutch is provided with a release sleeve adapted to be engaged by a camming finger associated with an activator assembly in order to cause disengagement of the clutch. The activator assembly is therefore arranged to be shifted between two operative positions in order to effect disengagement of one clutch and permit reengagement of the other. The clutches are arranged to transmit drive to the actuating shaft in opposite directions.

An important feature of the present invention therefore is to provide a clutch controlling activator assembly that is rapidly shifted between its operative positions in order to ensure a positive reversal of movement during a transition period of minimum duration. Adjustment facilities are associated with the activator assembly in order to obtain accurately timed release and reengagement of the clutches for smooth and trouble-free operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Brief description of the drawing figures

FIGURE 1 is a perspective view showing a cable winding guide mechanism with which the present invention is associated.

FIGURE 2 is a front elevational view of the mechanism shown in FIGURE 1.

FIGURE 3 is a partial transverse sectional view taken substantially through a plane indicated by section line 3—3 in FIGURE 2.

FIGURE 4 is a partial sectional view taken substantially through a plane indicated by section line 4—4 in FIGURE 3.

FIGURE 5 is an enlarged partial sectional view taken substantially through a plane indicated by section line 5—5 in FIGURE 3.

FIGURE 6 is an enlarged partial sectional view taken substantially through a plane indicated by section line 6—6 in FIGURE 2.

Description of the preferred embodiment

Referring now to the drawings in detail, FIGURE 1 illustrates a reversing cable guide mechanism generally denoted by reference numeral 10 through which a cable 12 withdrawn from some source (not shown) is guided as it is being wound upon the drum 14 so that the cable will be uniformly distributed longitudinally along the rotational axis of the drum between its end flanges. Toward this end, the cable 12 is entrained about a guide pulley 16 rotatably mounted by the cable guide mechanism 10 in operative relation to the winding drum 14.

Referring now to FIGURES 1 and 2, it will be observed that the cable guide mechanism 10 includes a mounting plate 18 to which a plurality of vertical frame plates 20, 22 and 24 are fixed in order to support the moving parts of the mechanism. The guide pulley 16 is rotatably mounted by a bracket 26 fixed to the top edge of a movable guide plate 28 disposed between the fixed frame plates 22 and 24. The guide plate 28 is advanced in opposite directions between the frame plates 22 and 24 by means of an actuating shaft 30 having an externally threaded screw portion 32 threadedly extending through a nut element 34 mounted by the guide plate 28. A guide rod 36 is fixedly interconnected between the frame plates 22 and 24 and extends through a slide bearing 38 mounted within the guide plate 28 in order to constrain movement of the guide plate along the rotational axis of the actuating shaft 30. The actuating shaft is rotatably mounted by the frame plates 22 and 24 in parallel spaced relation to the guide rod 36. Thus, rotation is imparted to the actuating shaft 30 in order to move the guide plate 28 between limit positions. The limit positions associated with the guide plate are determined by a pair of adjustable stop devices 38 mounted on a reversing control rod 40 that extends loosely through aligned openings formed in the movable guide plate 28 and the frame plates 22 and 24. Each stop device 38 includes an externally threaded tube loosely mounted on the control shaft 40 having a head portion 46 locked to the shaft 40 by a setscrew 48. The sleeve threadedly mounts a sleeve on which a coil spring 44 is carried, the opposite ends of which engage the head portion 46 and a knurled collar 42. The coil spring 44 therefore yieldably locks the collar 42 of the stop device in adjustably spaced relation to the head 46 through which the control rod is axially shifted following engagement of the collar by the guide plate 28 as it approaches its limit position. The shifting movement of the control rod 40 therefore effects a reversal in rotation of the actuating shaft 30 by means of a reversing mechanism generally referred to by reference numeral 50 disposed between the frame plates 20 and 22.

Power is supplied to the reversing mechanism 50 in order to impart rotation to the actuating shaft 30 from any suitable source of motive energy (not shown) through a drive belt 52 for example entrained about the input pulley wheel 54. The pulley wheel 54 is connected to the end of a drive shaft 56 which is journaled between the frame plates 20 and 22 as more clearly seen in FIGURES 1 and 4. Connected to the drive shaft between the frame plates 20 and 22 are axially spaced gears 58 and 60. The gear 58 is in constant mesh with a gear 62 associated with a one-way clutch device 64 rotatably mounted on an extension 66 of the actuating shaft 30, which is journalled between the frame plates 20 and 22. Also mounted on the shaft extension 66 in axially spaced relation to the one-way clutch 64, is a second one-way clutch 68 with which the gear 70 is associated. An idler gear 72 is rotatably mounted by the frame plate 22 in constant mesh with the gears 70 and 60. It will be apparent therefore, that the gears 62 and 70 will be driven in opposite directions relative to the drive shaft 56. The one-way clutches 64 and 68 are therefore arranged to transmit torque from the gears 62 and 70 to the shaft extension 66 in opposite directions only. Thus, while one of the clutches is in an engaged condition, the other of the clutches will be held disengaged under control of the reversing control rod 40 in order to rotate the actuating shaft in one direction or the other.

Referring now to FIGURES 1, 3 and 4, it will be observed that the control rod 40 slidably extends through an opening in the frame plate 20 aligned with the openings in the frame plates 22 and 24 aforementioned. A collar 74 is fixed to the control rod adjacent to the frame plate 20 by a setscrew 76 while an engaging plate 78 is fixed to the control rod by a setscrew 80 adjacent to the frame plate 22. A guide rod 82 is fixede to the frame plate 22 and extends loosely through an opening in the engaging plate 22. A guide rod 82 is fixed to the frame plate 22 40. It will be observed, that the control rod 40 is vertically aligned above the drive shaft 56 so that the drive shaft and the control rod slidably mount a shifter assembly generally referred to by reference numeral 84. The shifter assembly includes a block 86 provided with openings through which the control rod and drive shaft extend. A pair of coil springs 88 are mounted on the control rod on either side of the block 86 so as to yieldably center the shifting assembly 84 between the collar 74 and the engaging plate 78. Thus, axial displacement of the control rod 40 will yieldably displace the shifting assembly 84 between two operative positions in order to effect disengagement of one of the clutches 64 and 68 and reengagement of the other of the clutches. Toward this end, the shifting assembly is provided with a shifting yoke 88 secured by fasteners 90 to a mounting element 92 fastened to the shifting block 86 by the fasteners 94. The shifting yoke 88 straddles the shaft extension 66 as more clearly seen in FIGURE 3 and is provided with a pair of engaging studs 96 which project from opposite sides thereof for engagement with an activator assembly 98 splined to the shaft extension 66 between the clutches 64 and 68.

Except for the direction in which they transmit drive to the shaft extension 66, the clutches 64 and 68 are the same in construction and operation. These clutches are of a well known and commercially available type including a wrapping coil element 100 as shown in FIGURE 6. One end portion of the coil element 100 is anchored to a mounting hub 102 associated with the clutch to which the gear 62 or 70 is splined when the spring is in a contracted condition. The mounting hub is rotatably journaled by the sleeve bearing 104 on the sleeve portion 106 of an engaging hub 108 which is rotationally and axially fixed to the shaft extension by a transverse pin 110 that extends through the flange portion 112 associated with the engaging hub 108. The end of the wrapping coil 100 opposite the mounting hub 102, extends through an anchoring slot 114 in a release sleeve 116 which is rotatably mounted between the mounting hub 102 and the engaging hub 108 in enclosing relation to the coil 100. The release sleeve 116 is provided with a projection 118 through which it is adapted to be angularly displaced by a limited amount in one direction opposite to the direction in which torque is transmitted by the clutch in order to uncoil the engaging coil 100 in order to disengage it from the engaging hub 108 and hub 102. This type of clutch mechanism and its operation is well known as disclosed for example in U.S. Patent No. Re. 25,229 to Sacchini et al. Thus as shown in FIGURE 6 the clutch 64 is in a disengaged condition while the clutch 68 is in an engaged condition wherein the coil 100 is normally clamped to the engaging hub 108 and withdrawn from the release sleeve 116 which will then rotate with the clutch. It will be appreciated therefore, that in the situation illustrated in FIGURES 2 and 6, drive is transmitted in one direction to the actuating shaft 30 by the engaged clutch 68, the clutch 64 being held disengaged by the activating assembly 98 which is then in engagement with the flange portion 112 of the clutch.

As more clearly seen in FIGURES 2, 4 and 6, the activating assembly 98 includes a hub portion 120 also straddled by the shifting yoke 88 between the flange portions 122 adjustably secured to the hub portion 120. The flange portions 122 are therefore adapted to be engaged by the engaging studs 96 projecting from opposite sides of the shifting yoke 88 in order to displace the activating assembly between operative positions respectively engaging the flange portions 112 associated with the clutches 64 and 68. Accordingly, the hub portion is slidably mounted by any suitable spline 124 on the shaft extension 66 so that it will rotate with the shaft extension yet be axially shiftable relative thereto between the clutches. The flange portions 122 on the other hand, are fixed to the hub portion in an angularly adjusted position by setscrews 126 engaging within recesses 128 formed in the hub portion as shown in FIGURE 6. Each of the flange portions is also provided with a peripheral recess 130 as more clearly seen in FIGURE 3 within which one end of a camming finger 132 is secured by fasteners 134. The camming fingers 132 extend from the flange portions 122 in opposite axial directions and are provided with oppositely facing cam surfaces 136 in contact with the projections 118 on the sleeves 116 associated with the clutches 64 and 68. Thus, when the activating assembly 98 is shifted toward one of he clutches, the camming finger 132 will angularly displace the release sleeve 116 associated therewith in order to effect disengagement of the associated clutch when the activating assembly engages the clutch. Axial displacement of the other camming finger on the other hand, will permit the release sleeve associated with the other clutch to be angularly displaced by the self-wrapping action of the associated coil 100 so as to permit reengagement of this clutch. The activating assembly is therefore shifted between its two operative positions in response to yieldable displacement of the shifting assembly 84 by the control rod 40 through the centering springs 88.

In order to ensure rapid movement of the activating assembly 98 between its operative positions as well as to yieldably hold the activating assembly in either of its operative positions, a snap action toggle device 138 is provided. As shown in FIGURES 2, 3 and 5, the toggle device includes an element 140 having a pointed end 142 received within a conical recess 144 formed in the shifting block 86. A coil spring 146 is enclosed within the element 140 about the shank 148 of an extensible member 150 provided with a flange 152 against which the spring reacts and a conical end 154 received in a conical recess formed in an adjustable screw element 156 threadedly mounted by the frame plate 18. Thus, the tension of the spring 146 may be adjusted by positioning of the screw element 156 in order to regulate the force with which the activating assembly is displaced by the toggle device 138 past a center position toward an operative position when the activating assembly is moved by the control rod 40.

From the foregoing description, the construction and operation of the cable guide reversing mechanism and in particular the clutch control aspects thereof, will be apparent. It will be appreciated, that the one-way clutches 64 and 68 utlized are of the self-engaging type so as to ensure that drive will be transmitted to the actuating shaft in the proper direction. Also, despite the use of a reversing control arrangement having shock absorbing facilities, positive displacement of the activating assembly to its operative positions is assured by a snap action toggle device. Further, adjustment facilities are provided in order to accurately time the disengagement and reengagement of the clutches during a transitional period of short duration so as to obtain a smooth reversal of drive.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a guide displaceable between limit positions by an actuating shaft adapted to be driven in opposite directions by reversing gears, a pair of one-way clutches mounted in fixed axially spaced relation on the actuating shaft normally transmitting torque from the gears in oppositie directions, each of said clutches having a release element angularly displaceable in a releasing direction relative to the shaft opposite to the direction in which torque is transmitted thereto for disengaging the clutches, an activating member rotatable with said actuating shaft and axially movable thereon between said pair of clutches, engaging means extending from said activating member in contact with both of said release elements for limited angular displacement of each of said release elements in response to axial movement of the activating member into engagement with the associated clutches, reversing control means engageable with said activating member for axial displacement thereof from engagement with one of the clutches when the cable guide reaches the limit positions thereof, and snap-action means for rapidly moving the activating member into engagement with the other of said clutches following said displacement of the activating member by the reversing control means.

2. The combination of claim 1 wherein each of said one-way clutches is of the coil spring type enclosed by the release element, said release element including a sleeve having a projection engageable by the engaging means.

3. The combination of claim 2 wherein said engaging means comprises a pair of camming fingers extending axially from from the activating member into contact with the projections on the sleeves of the release elements, and means mounting the camming fingers on the activating member in adjustably fixed, angularly spaced relation to each other.

4. The combination of claim 3 wherein said snap-action means comprises a toggle device yieldably holding the activating member in engagement with either one of the pair of clutches.

5. The combination of claim 1 wherein said engaging means comprises a pair of camming fingers extending axially from the activating member into contact with the release elements, and means mounting the camming fingers on the activating member in adjustably fixed, angularly spaced relation to each other.

6. The combination of claim 5 wherein said snap-action means comprises a toggle device yieldably holding the activating member in engagement with either one of the pair of clutches.

7. The combination of claim 1 wherein said snap-action means comprises a toggle device yieldably holding the activating member in engagement with either one of the pair of clutches.

8. The combination of claim 7 wherein each of said one-way clutches is of the coil spring type enclosed by the release element, said release element including a sleeve having a projection engageable by the engaging means.

9. In combination with an element displaceable between limit positions by a rotating actuating shaft adapted to be driven in opposite directions by reversing gears, a pair of self-engaging one-way clutches mounted on the actuating shaft for transmitting torque thereto in opposite directions, axially displaceable release means mounted on the shaft for alternative engagement with the clutches to disengage the same in response to torque transmitted from the actuating shaft, reversing control means engageable with said release means for axial displacement thereof from engagement with one of the clutches when the element reaches one of the limit positions thereof, and snap-action means engaging the release means independently of the control means for rapidly moving the release means into the engagement with the other of said clutches following said displacement thereof by the reversing control means.

10. The combination of claim 9 wherein said reversing control means includes angularly adjustable camming means for disengagement of one of the clutches in response to torque transmitted through the other of the clutches from the actuating shaft.

11. In combination with a winding cable guide displaceable between limit positions by an actuating shaft adapted to be driven in opposite directions by reversing gears, a pair of one-way clutches mounted on the actuating shaft for transmitting torque thereto in opposite directions, axially displaceable release means mounted on the shaft for alternative engagement with the clutches to disengage the same, reversing control means engageable with said release means for axial displacement thereof from engagement with one of the clutches when the cable guide reaches one of the limit positions thereof, and snap-action means for rapidly moving the release means into engagement with the other of said clutches following said displacement thereof by the reversing control means, the release means comprising an activating member slidably mounted on the shaft between the clutches, said clutches having releasing sleeves angularly displaceable relative to the shaft for disengaging the clutches, a pair of camming fingers extending axially from the activating member into contact with the releasing sleeves for angular displacement thereof upon axial movement of the activating member, and means mounting the camming fingers on the activating member in adjustably fixed, angularly spaced relation to each other.

12. The combination of claim 11 wherein said snap-action means comprises a toggle device yieldably holding the release means in engagement with either one of the pair of clutches.

References Cited

UNITED STATES PATENTS

| | | | |
|---|---|---|---|
| Re. 25,229 | 8/1962 | Sacchini et al. | |
| 1,338,086 | 4/1920 | Kendall | 74—59 |
| 1,579,923 | 4/1926 | Gibson | 242—158.4 |
| 2,475,432 | 7/1949 | Marihart. | |
| 2,483,688 | 10/1949 | Brown | 242—158.2 |
| 2,513,815 | 7/1950 | Nelson et al. | 242—158.4 |
| 2,551,739 | 5/1951 | Harlan. | |
| 2,643,749 | 6/1953 | Greenlee. | |
| 2,685,949 | 8/1954 | Dunlap. | |
| 2,829,748 | 4/1958 | Sacchini et al. | |
| 2,912,186 | 11/1959 | Clarke et al. | 242—158.4 |

FOREIGN PATENTS

| | | |
|---|---|---|
| 964,935 | 7/1964 | Great Britain. |
| 454,362 | 1/1950 | Italy. |

STANLEY N. GILREATH, Primary Examiner

U.S. Cl. X.R.

74—59; 192—41